(12) United States Patent
Rodriquez et al.

(10) Patent No.: US 7,734,521 B2
(45) Date of Patent: Jun. 8, 2010

(54) NETWORKED METHOD AND SYSTEM FOR CREATING AND SETTLING FINANCIAL INSTRUMENTS

(75) Inventors: Hernan Rodriquez, New York, NY (US); Brian Kane, New York, NY (US)

(73) Assignee: The Bank of New York Mellon Corporation, New York, NY (US)

( * ) Notice: Subject to any disclaimer, the term of this patent is extended or adjusted under 35 U.S.C. 154(b) by 200 days.

(21) Appl. No.: 11/855,673

(22) Filed: Sep. 14, 2007

(65) Prior Publication Data

US 2008/0071665 A1  Mar. 20, 2008

Related U.S. Application Data

(60) Provisional application No. 60/844,653, filed on Sep. 15, 2006.

(51) Int. Cl.
*G06Q 30/00* (2006.01)
(52) U.S. Cl. .................. 705/35; 705/36 R; 705/37; 705/42; 705/44
(58) Field of Classification Search ............ 705/35–44
See application file for complete search history.

(56) References Cited

U.S. PATENT DOCUMENTS 7,496,531 B1 * 2/2009 Gastineau et al. ............ 705/35

2002/0161692 A1 * 10/2002 Loh et al. ..................... 705/37
2004/0107156 A1 * 6/2004 Levine ........................ 705/37
2006/0095361 A1 * 5/2006 Rude .......................... 705/37

OTHER PUBLICATIONS

Kuala Lumpur Stock Exchange "Short Settlement Period For Securities", National Government Economics, p. 1, dated Nov. 28, 2000, Country: Malaysia.*
International Search Report and Written Opinion issued on Oct. 1, 2008 in corresponding International Application No. PCT/US07/78474.

* cited by examiner

*Primary Examiner*—Ella Colbert
*Assistant Examiner*—Hai Tran
(74) *Attorney, Agent, or Firm*—Pillsbury Winthrop Shaw Pittman LLP; Larry J. Hume

(57) ABSTRACT

A financial instrument is provided that enables investors to invest in depositary receipts based on underlying non-domestic shares of a foreign business entity through a domestic stock exchange even though the underlying non-domestic shares are traded only on a stock exchange with a settlement day that has no substantial temporal overlap with the investor's domestic stock exchange's settlement day. In accordance with at least one embodiment of the invention, an international trading transaction structure and corresponding methodology is provided that enables investment in such financial instruments while guarding against currency market fluctuations during the trade period prior to settlement.

20 Claims, 13 Drawing Sheets

## NETWORKED METHOD AND SYSTEM FOR CREATING AND SETTLING FINANCIAL INSTRUMENTS

This application claims priority to U.S. Application No. 60/844,653, filed Sep. 15, 2006, the entire contents of which is incorporated by reference.

FIELD OF INVENTION

The present invention relates generally to financial instruments and the creation, trading or settlement of financial instruments. More specifically, the present invention relates to Depositary Receipts and the creation, trading or settlement of Depositary Receipts.

BACKGROUND

Depositary Receipts (DRs) are negotiable financial instruments that provide domestic investors with a means to invest in foreign companies not traded on domestic exchanges of the investor. DRs are issued by financial institutions and may be redeemed for shares of the underlying foreign business entities they represent. DRs are regularly traded in U.S. and European stock exchanges. Accordingly, DRs can be denominated in U.S. dollars, euros, British pounds, Japanese yen or any other national currency.

Depositary Receipts may be traded in the United States on U.S. stock exchanges. DRs were first introduced in the U.S. in the 1920's in order to streamline the process of investing in business entities not traded on a U.S. exchange. DRs may represent investment in non-U.S. business entities, and, as with other types of DRs, the underlying shares of these non-U.S. businesses. The stock of the underlying non-U.S. businesses is traded on a non-U.S. stock exchange while the DRs themselves trade on a U.S. exchange.

FIG. 1 illustrates a process used by entities to generate and maintain DRs 105. Two financial institutions are generally involved in maintaining DRs 105 on a U.S. stock exchange 110: broker/dealer 115 and a depositary bank 120. The broker/dealer 115 purchases the underlying shares 125 of the foreign business entity and offers them for sale in the U.S. The depositary bank 120 handles the issuance and cancellation of DR certificates 105, backed by the underlying shares held by the investment bank, based on orders 130 placed by investors 145 through brokers 140.

While the underlying shares 125 of the foreign business entity are valued in a foreign currency, the DRs 105 themselves are valued in U.S. dollars. Based on a determined DR ratio, each DR 105 may be issued as representing one or more or a fraction of the underlying shares 125 and the price of each DR 105 will be reflected in the currency in which it is traded. Currency fluctuations have some influence on the U.S. dollar price of the DR 105 because a conversion is needed to compare the price of the DR with the price of the underlying stock. This is because as the foreign currency appreciates the DR appreciates.

To issue a DR 105, the broker/dealer 115 arranges to buy the shares of the non-U.S. business entity on a foreign stock exchange 135 so that the broker/dealer may have the DRs 105 issued on the U.S. stock exchange 140. Accordingly, the DRs 105 may be considered to be repackaged shares, backed by the actual foreign business entity shares 125, but owned by a beneficial owner of the DR investor.

The continual buying and selling of both DRs 105 and the underlying shares 125 on the U.S. stock exchange 110 and the foreign stock exchange 135 works to maintain the prices of the DR 105 and the underlying shares 125 in close parity with one another. Because of this close parity, most DRs 125 are traded by means of intra-market trading.

When a DR 105 is traded, a broker 140 works to find the best price of the underlying shares 125 in question. The broker 140 compares the U.S. dollar price of the DR 105 with the U.S. dollar equivalent price of the underlying share 125 in the home country market 135. If the DR 105 of the underlying share 125 is trading higher then the corresponding quantity of underlying shares 125 (converted from the foreign currency to U.S. dollars), a broker 140 may buy more of the underlying shares 125 and issue DRs 105 on the U.S. market. This action would then, in theory, cause the price of the underlying shares 125 and the price of the DR 105 to reach parity. Therefore, the price of the DRs 105 floats on supply and demand. If the price of the DR 105 is significantly different from the price of the underlying shares 125 in the home country of the foreign business entity (accounting for the currency exchange rate), then an arbitrage opportunity may exist, which is then corrected by the participation of arbitrage investors, who take advantage of the spread and eliminate the opportunity.

A broker 140 may also sell DRs 105 back into the foreign stock exchange 135. This is known as cross-border trading. When this trading occurs, a quantity of DRs 105 is canceled by the depositary bank 120 and a corresponding quantity of the underlying shares 125 are released from the broker/dealer 115.

Types of Depositary Receipts (DRs) include Global Depositary Receipts (GDRs), European Depositary Receipts (EDRs), and International Depositary Receipts (IDRs). DRs are traded on a U.S. stock exchange, such as the New York Stock Exchange (NYSE) or the America Stock Exchange (ASE), GDRs are commonly listed on European stock exchanges such as the London Stock Exchange. Both DRs and GDRs are usually denominated in U.S. dollars, but can also be denominated in euros or other national currencies.

SUMMARY OF THE INVENTION

The invention relates to financial instruments and more particularly to depositary receipts. This can include the creation, promotion, trade, or settlement of depositary receipts in U.S. financial markets as well as in foreign financial markets. In some embodiments, depositary receipts may be promoted, created, traded, or settled on stocks or exchange traded funds in foreign financial markets that do not have a settlement day that overlaps the domestic financial market offering the depositary receipt. In some embodiments, the promotion, creation, trading, or settlement may include having an underwriting firm commit capital for orders of foreign securities to back domestic depositary receipts prior to receiving any orders for DRs of the foreign securities from a domestic broker or other domestic customer. In some embodiments, this promotion, creation, trading, or settlement, may include methods and mechanisms to guard against currency fluctuations during the period from the execution of a trade to the settlement of a trade. This may include when the market in which the trade for a DR is made has closed before the market in which the security underlying the DR has opened. This may include DRs sold in Japan and other Asian markets for U.S. company based securities. Numerous other embodiments of the invention are also possible.

DETAILED DESCRIPTION

Figure 1:
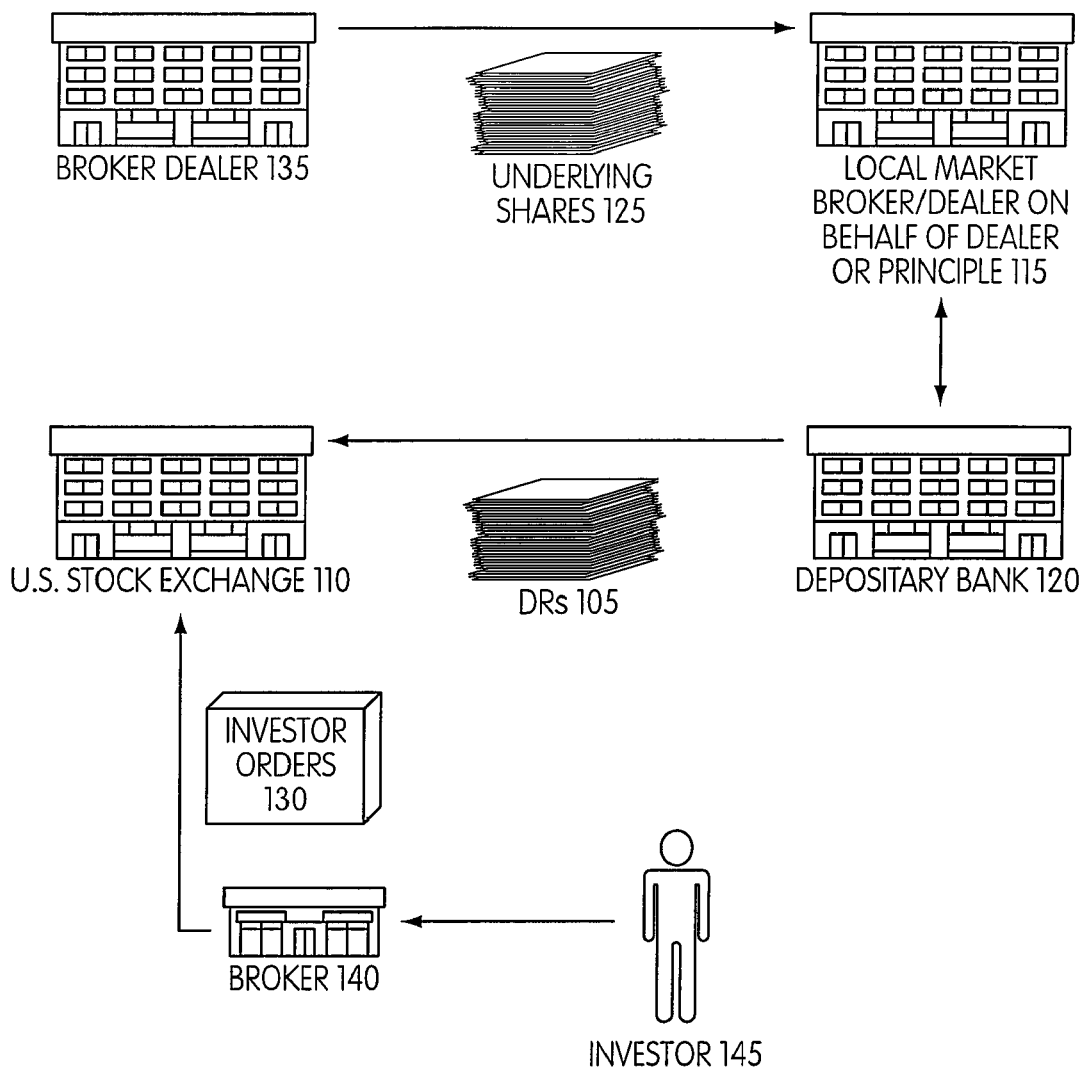
FIG. 1 illustrates a relationship structure that is conventionally necessary to generate and maintain DRs.

Throughout the world, domestic stock markets have varying settlement schedules, e.g., the U.S. is a "trade plus three" settlement, i.e., payment for a trade is not due until three business days after submission of the trade order. Therefore, the transaction need not be settled until the trade day plus three business days. When the markets in which the trade settlements occur share at least some of the same hours of operation, simultaneous trading and settlement can occur. An example of these types of markets include U.S. and Europe financial markets, which have trading days that overlap for at least some period of time during each day. However, when the markets in which the trade or settlement of the trade occur are far apart from each and do not share any overlapping hours of operation, simultaneous day trading or settlement can not occur. For example, because Japan or other Asian markets are half a day ahead of the United States, one cannot trade in both markets for some or all of the trading day. Likewise, there is little or no overlap in the settlement day between the Asian markets and the U.S. markets.

In accordance with at least one embodiment of the invention, a mechanism is provided by which a Japanese or other Asian investor might invest in a non-Japanese or non-Asian business entity by way of acquiring and trading a Japanese Depositary Receipt (JDR) or an Asian Depositary Receipt that represents a security that is held in custody by a financial institution. As described and explained herein there are various in which these trades and settlements may occur. These include the methods and steps as taught herein, components of the methods and steps taught herein, and other methods and steps suggested by the application.

A convenient way of addressing the concept of a DR and its use with the invention is through an analogy using a coat and a coat check ticket issued by a coat checker. In this analogy a coat owner hands over his coat to the coat checker (a bailee) who in turn gives the coat owner a ticket that may be presented to the coat checker at a later time in order to receive the coat back. (The coat in the instance would be the stock and the ticket would be the DR.) That ticket may be held by the coat owner or it may be given or sold to someone else. At some later time, that ticket may be presented to the coat checker and the coat may be returned to the person holding the ticket. Thus, the owner of the ticket is the effective owner of the coat. Similar to this coat check ticket, a JDR is a financial "ticket" that entitles the owner at any point to redeem the depositary receipt for the underlying securities from the issuer of the JDR. The JDR's value in the marketplace is based on both: (1) the "ticket holder's" ability to redeem the JDR for the underlying securities; and (2) the assurance of the issuing international bank that any benefits such as dividends that the underlying security spends out will be delivered to the holder of the JDR.

Building upon the coat check analogy, the owner of the coat may wish to sell the coat to a companion. If the companion agrees on a price for the coat with the owner, they may return to the coat check, where the owner redeems the ticket for his coat and the companion makes the exchange of the coat for the agreed upon price, thereby completing the transaction. However, alternatively, the coat owner may simply exchange the coat check ticket for the agreed upon price and the transaction is complete. Subsequently, the purchaser (companion) could redeem the ticket for the coat. Because that coat check ticket provides the ability to retrieve the coat from the coat check, that coat check ticket has value. Therefore, a purchaser could subsequently turn around and sell the coat check ticket to another individual. In the same way, a DR may be sold multiple times without the underlying shares being redeemed.

Figure 2:
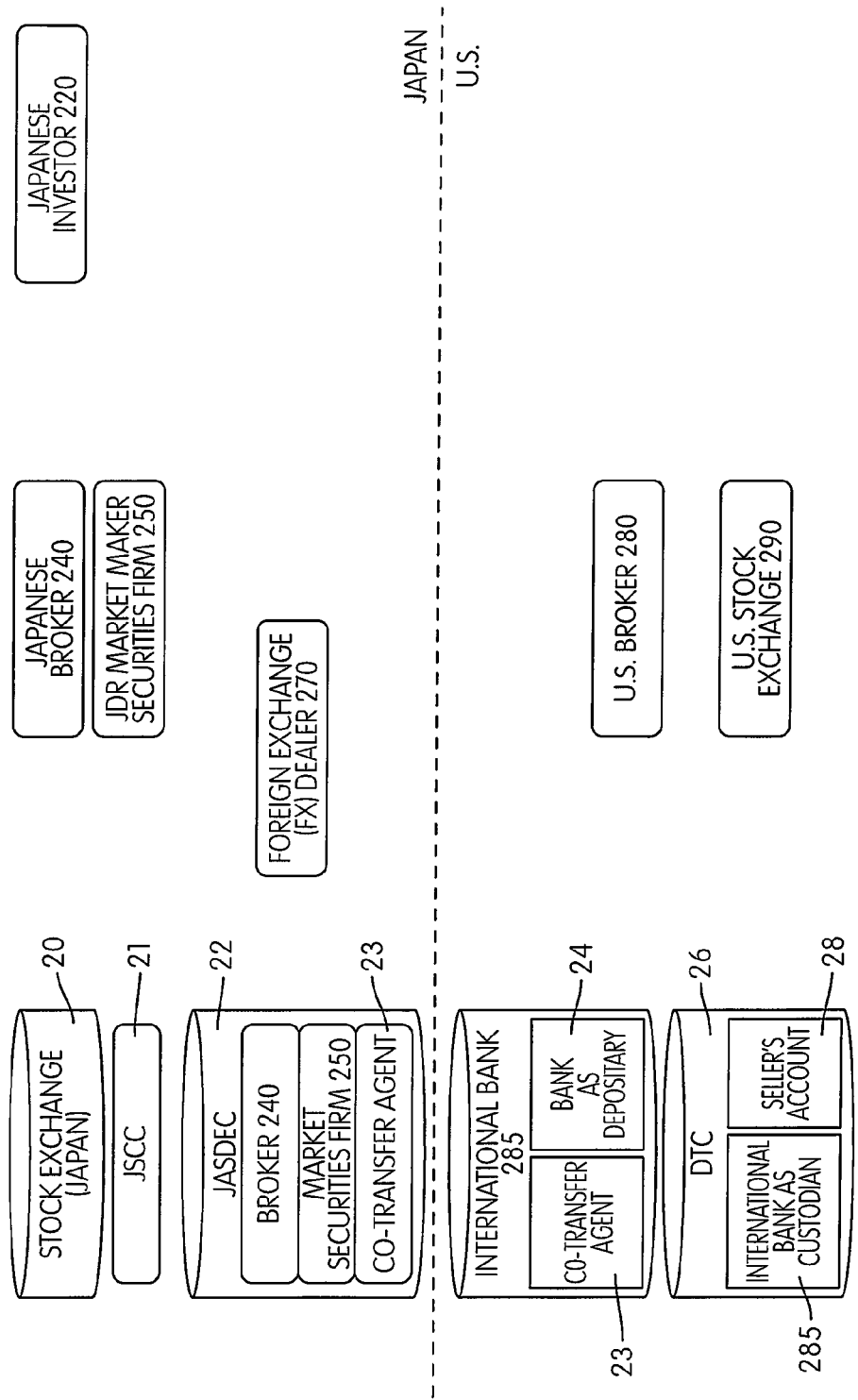
FIG. 2 illustrates parties that may be involved in a process for JDR trading on a Japanese Exchange in accordance with one or more embodiments of the invention.

FIG. 2 illustrates various entities that may be involved in the creation, promotion, trade, or settlement of depositary receipts in U.S. and foreign financial markets. These entities include those that may be involved in the creation, promotion, trade, or settlement of depositary receipts in and between Japanese or Asian markets and the U.S. or other financial markets. The stock exchanges and financial institutions supporting the financial transactions are shown on the left side of FIG. 2. The brokers are generally shown in the center of FIG. 2 and the investor(s) is shown on the right side of FIG. 2. Each of the entities above the dashed line are located in Japan or associated with the Japanese financial market while all of the entities below the dashed line are located in the U.S. or associated with the U.S. financial market. The stock exchanges of Japan and the U.S. are shown at 20 and 290, respectively in FIG. 2. These exchanges include the Tokyo Stock Exchange (TSE) and the New York Stock Exchange (NYSE). The Japanese Securities Clearing Center (JSCC) is shown at 21 and the Japanese Securities Depository Center (JASDEC) is shown at 22. The JASDEC 22 is shown associated with Japanese brokers 240, market maker security firms 250, and local co-transfer agents 23. The remaining entities on the Japanese side of the figure include the Japanese investor 220 and the Foreign Exchange (FX) Dealer 270.

On the lower half of FIG. 2, an international bank 285 associated with the local co-transfer agent 23 and the bank as depositary 24 is shown along with the Depository Trust Company 26 (DTC), which is itself associated with the international bank 285 and the seller's account 28. The U.S. broker 280 is also shown on the lower half of FIG. 2. If other countries were involved in financial vehicles embodying the invention, the applicable stock exchanges, brokers and clearing houses would be involved instead.

Figure 3:
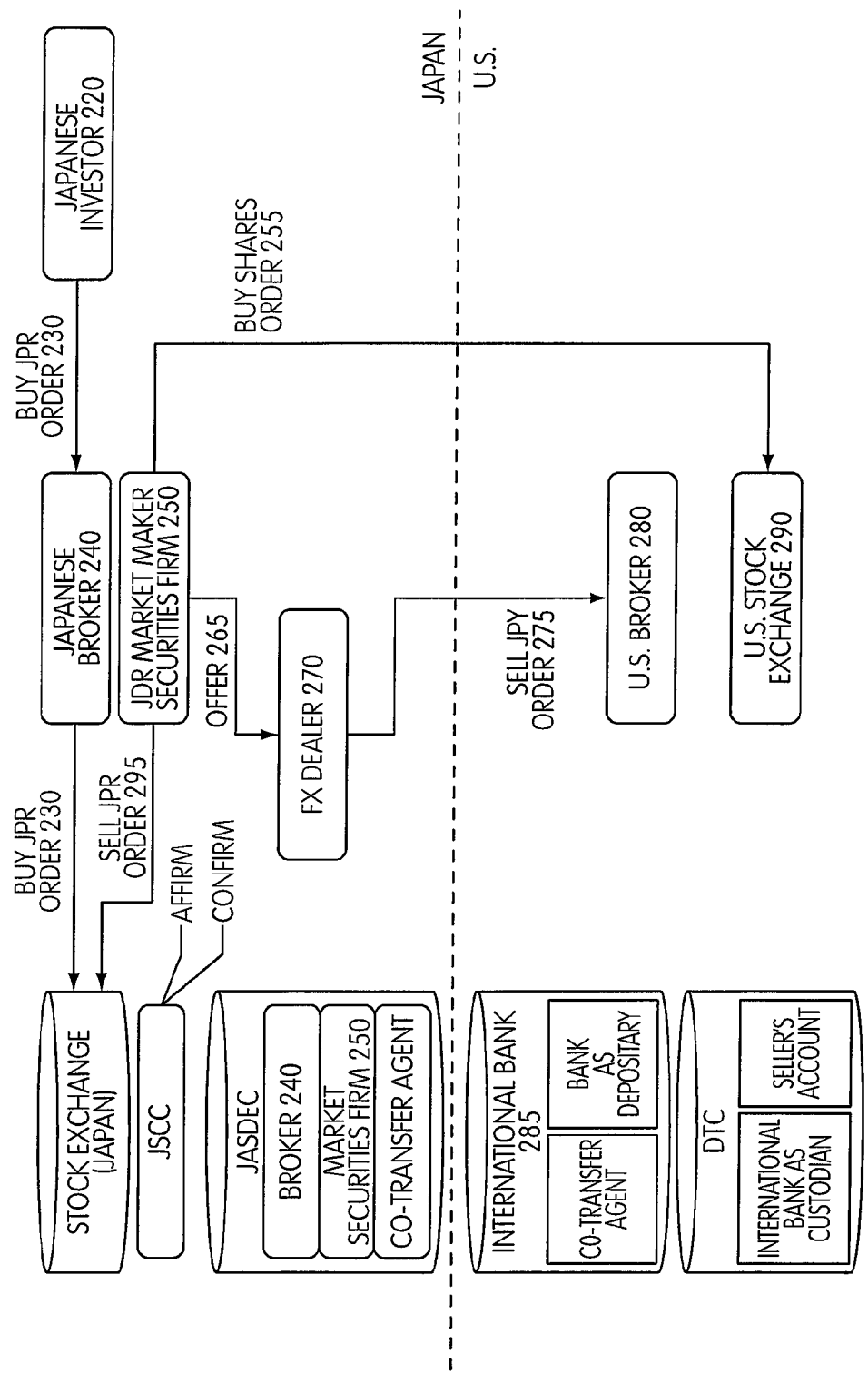
FIG. 3 illustrates operation and cooperation of parties involved in a process for JDR trading on a Japanese Exchange on a JDR trade date in Japan in accordance with at least one embodiment of the invention.

To carry out a DR transaction in accord with embodiments of the invention, one or more of the various entities in FIG. 2 may become involved at various times during the promotion, trade or settlement of the DR. Figures in the application that follow FIG. 2 show various ways in which these entities may act and the ways in which the new and novel processes and systems of the application may be carried out or undertaken. FIG. 3, illustrates a configuration that may be used to issue a JDR in accord with embodiments of the invention. Here, a Japanese investor (or other Asian investor) 220 submits an order 230 through his broker 240 (which, may be, for example, an online securities firm) to buy JDRs (or Asian DRs). A JDR market maker securities firm 250 fills the order 230 by agreeing to sell those JDRs at a price denominated in the sell order 295 which is affirmed and confirmed by the Japanese Securities Clearing Center (JSCC). The JDR market maker securities firm 250 then places a buy shares order 255 to purchase the underlying securities that will support the issuance of the JDR.

As illustrated in FIG. 3, the JDR market maker securities firm 250 creates the JDR by submitting the buy order 255 for the underlying securities to the U.S. Stock Exchange 290. During the Japanese trading day (trade date=day 0), the JDR market maker securities firm 250 also places an offer 265 to sell Japanese yen to a foreign exchange dealer 270, which the dealer 270 will in turn use to buy U.S. dollars via order 275 with a U.S. broker 280. Thus, the offer 265 from the JDR market maker securities firm 250 may indicate, for example, that in a specified number of days, e.g., two business days, the JDR market maker securities firm 250 will provide an agreed upon amount of yen, and, in return, the foreign exchange dealer 270, will provide a corresponding amount of U.S. dollars. The offer 265 will also indicate a depositary account at the Depository Trust Company (DTC) in the United States of American where those U.S. dollars should be deposited on the specified day.

When that offer 265 is transmitted to the foreign exchange dealer 270, it is nighttime in the United States. Thus, the securities firm 250 must wait until the corresponding U.S. business day begins to enter a buy order 255 with the U.S. stock exchange 290; however, FIG. 2 illustrates that the firm 250 may place the buy order 255 on the Japanese trade date (day 0). Thus, after the firm 250 sells the JDR, the firm 250 may "fix," i.e., finalize, the foreign exchange rate, and attempt to buy the underlying shares for the JDR, which, in the illustrated example, are U.S. securities.

Figure 4:
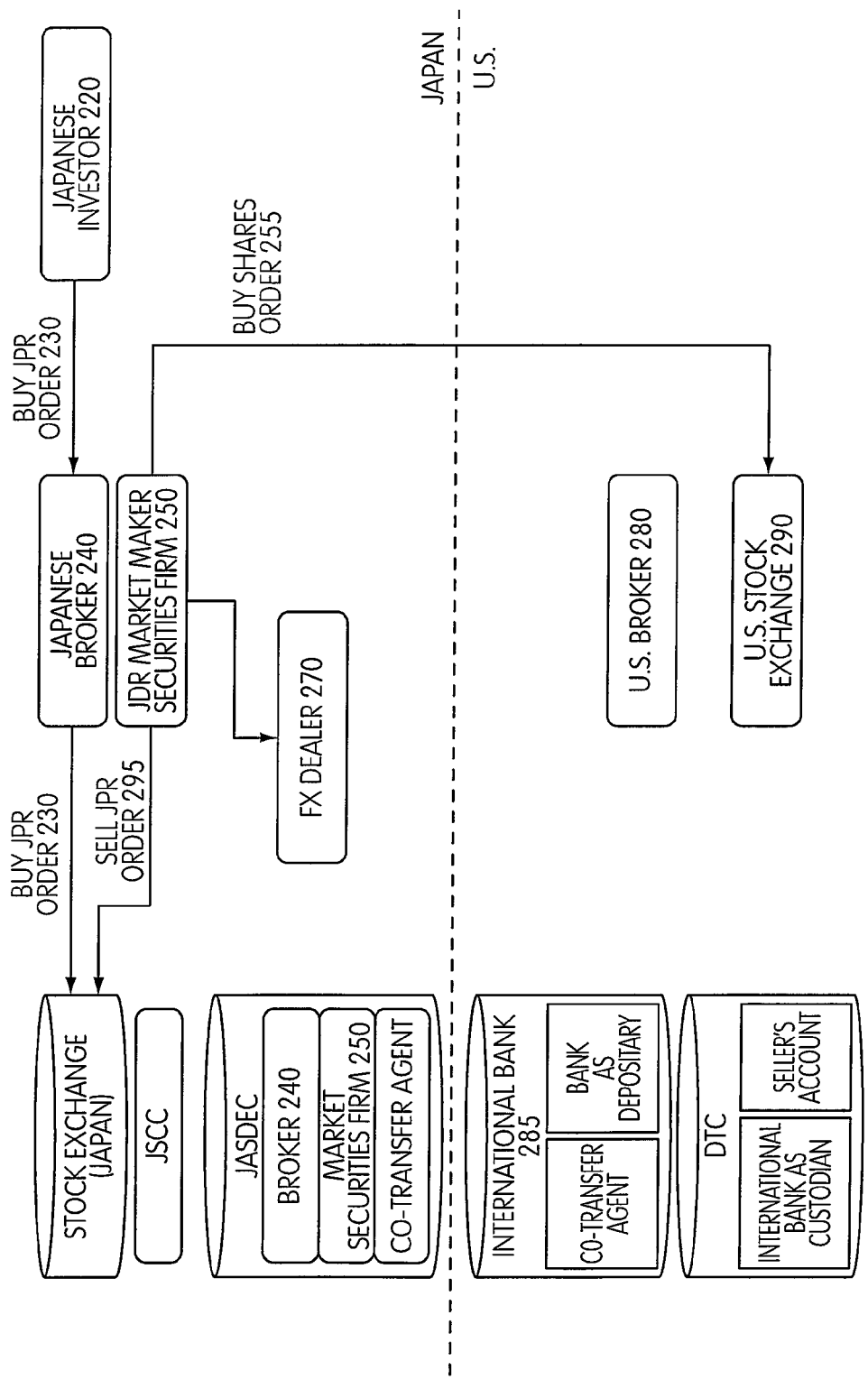
FIG. 4 illustrates operation and cooperation of parties involved in the process for JDR trading on the Japanese Exchange on the U.S. trading day corresponding to the JDR trade date in Japan in accordance with at least one embodiment of the invention.

FIG. 4 illustrates operation and cooperation of parties involved in the process for JDR trading on the Japanese Exchange on the U.S. trading day corresponding to the JDR trade date in Japan. Thus, in FIG. 4, the Japanese trading day has ended and the trading day is beginning in the U.S. (day 0.5). As shown in FIG. 4, the buy order 255 is received from the Japanese market maker firm 250 sent the previous day (day 0). The requested securities are then purchased on a U.S. Exchange 290. However, in such a scenario (as explained above), securities are not paid for on the same day (day 0.5-1.5) that the order is put in on the U.S. exchange. Rather, payment is required on the third business day (day 3.5), i.e., trade plus three settlement. However, the conventional delay in delivery of the purchase payment until the third business day exposes the securities purchaser to the effects of currency market movements during the period beginning when the buy order is placed until payment is received. In other words, trade (the submission and acceptance of the buy order 255) plus settlement (i.e., the exchange of the security and the purchase price) is equal to the trade plus three business days of market movements.

Figure 5:
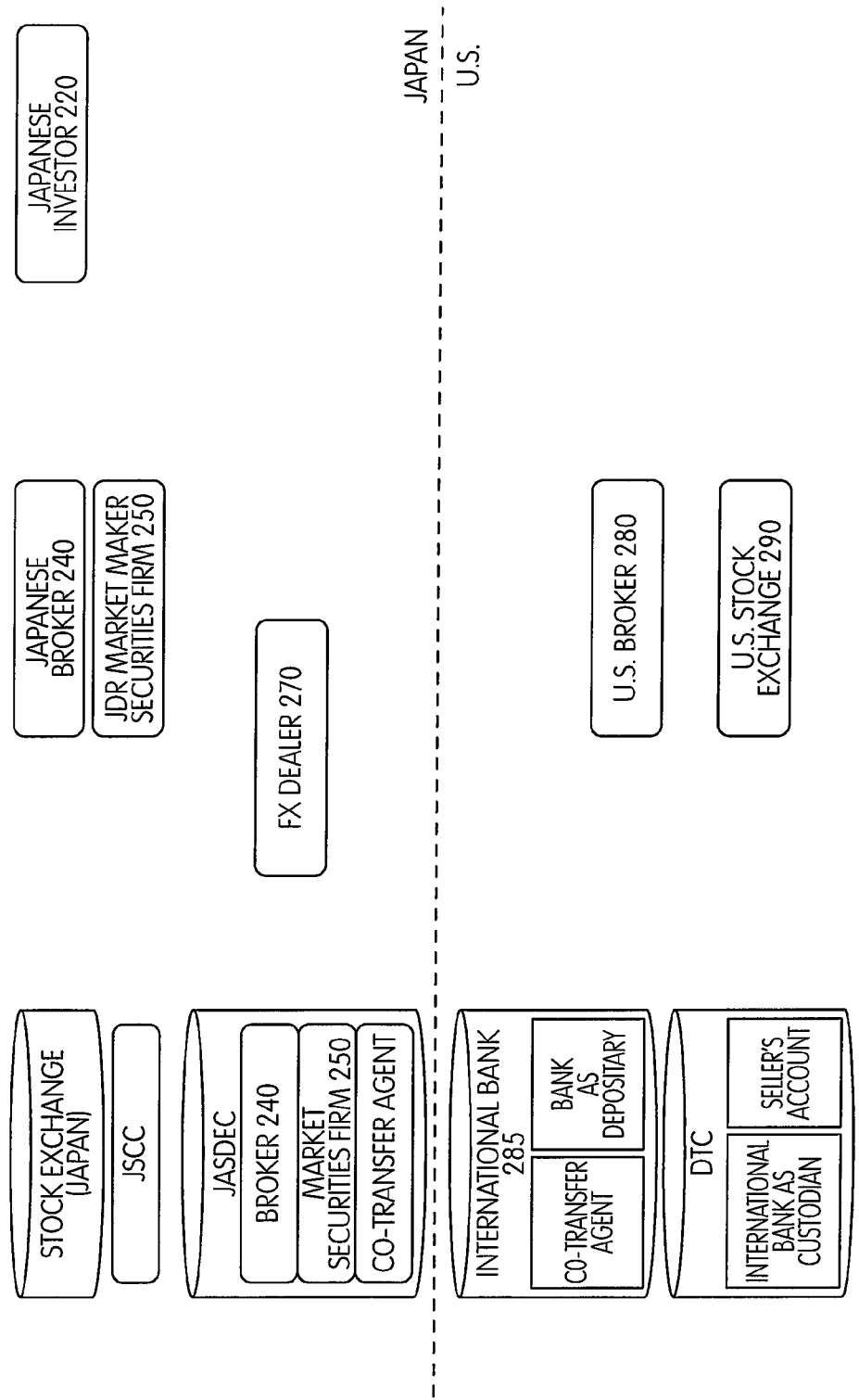
FIG. 5 illustrates operation and cooperation of parties involved in the process for JDR trading on the Japanese Exchange on the JDR trade date in Japan plus one day in accordance with at least one embodiment of the invention.
Figure 6:
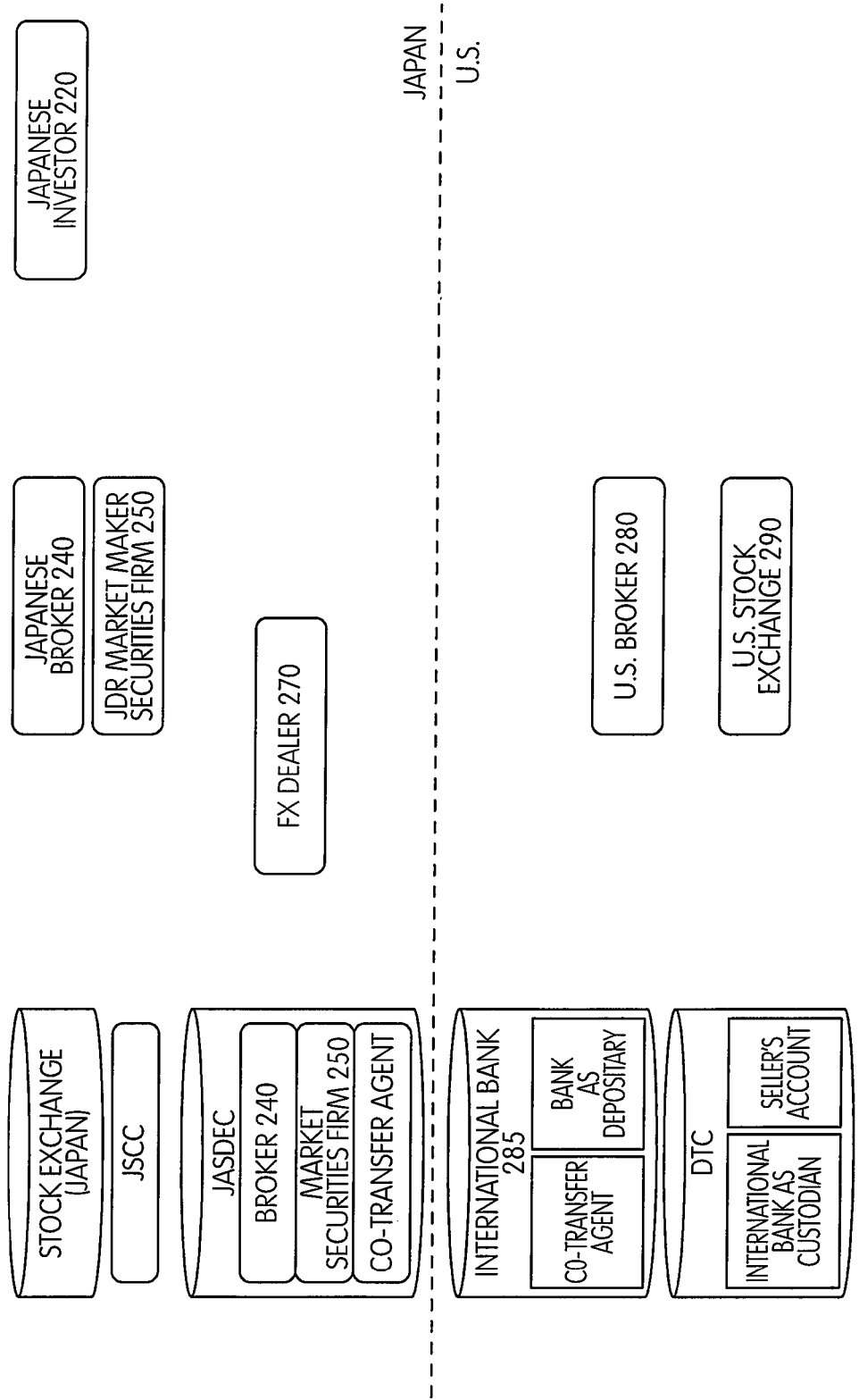
FIG. 6 illustrates operation and cooperation of parties involved in the process for JDR trading on the Japanese Exchange on the U.S. trading day corresponding to the JDR trade date in Japan plus one day in accordance with at least one embodiment of the invention.

FIG. 5 illustrates operation and cooperation of parties involved in the process for JDR trading on the Japanese Exchange on the JDR trade date in Japan plus one day (day 1). Similarly, FIG. 6 illustrates operation and cooperation of parties involved in the process for JDR trading on the Japanese Exchange on the U.S. trading day corresponding to the JDR trade date (day 1.5). As illustrated in FIGS. 5 and 6 no operations need to occur between any of the involved parties regarding the JDRs.

Figure 7:
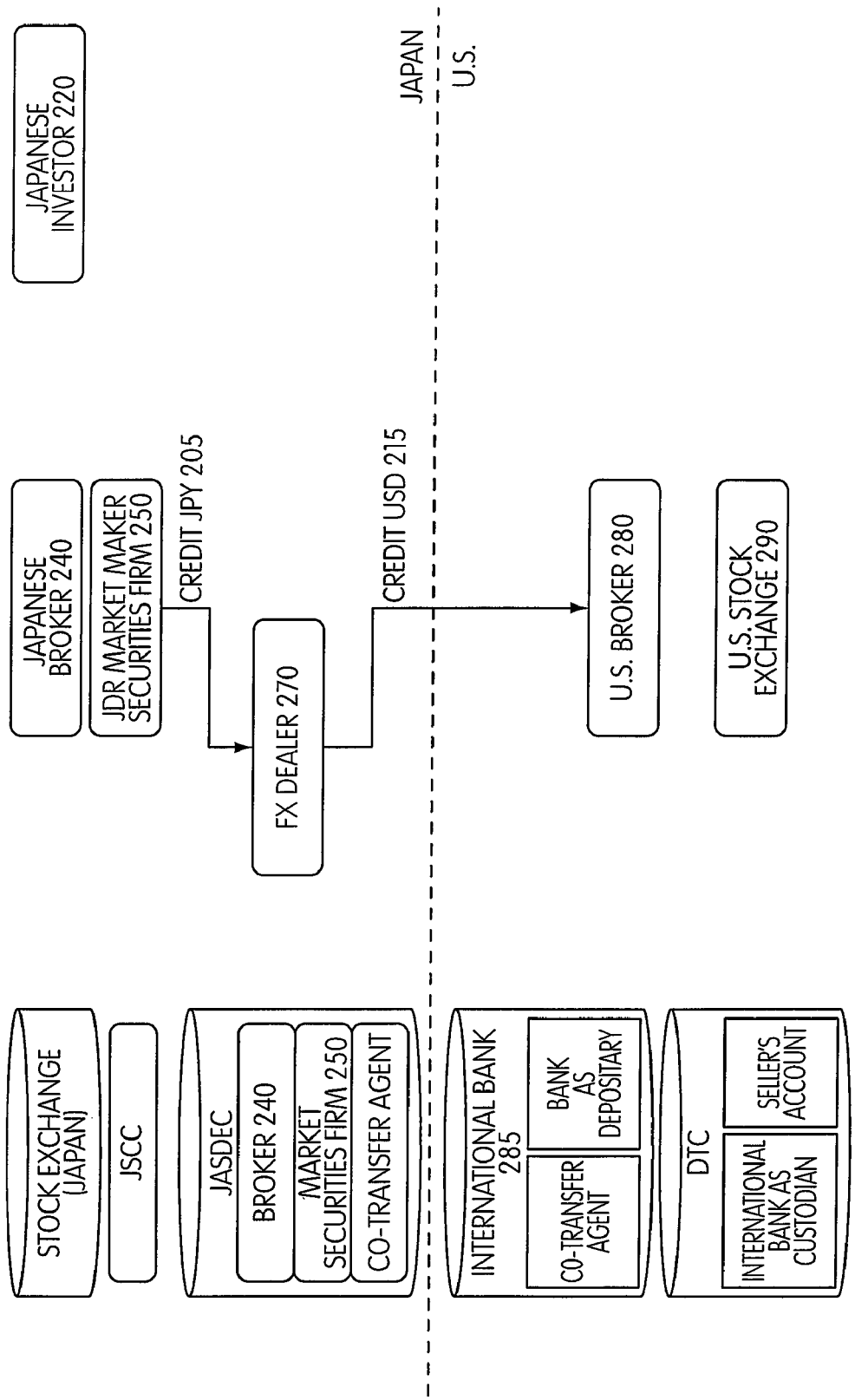
FIG. 7 illustrates operation and cooperation of parties involved in the process for JDR trading on the Japanese Exchange on the JDR trade date in Japan plus two days in accordance with at least one embodiment of the invention.

However, on day 2, as illustrated in FIG. 7, operation and cooperation of parties involved in the process for JDR trading on the Japanese Exchange continues. FIG. 7 illustrates those operations on the JDR trade date in Japan plus two days, when the foreign exchange dealer 270 settles the currency related offer 265 by selling the yen (Credit JPY 205) and purchasing U.S. dollars (Credit USD 215). Those purchased U.S. dollars 215 are then deposited into a depositary account at the U.S. broker 280 by the opening of the New York Exchange 290 the following day (day 2.5; illustrated in FIG. 8) to pay for the purchased underlying securities of the JDR at settlement on day 3.5 (see FIG. 10).

Thus, even though the market maker securities firm 250 entered into a contract with the foreign exchange dealer 270 on day 0, the market maker securities firm 250 need not actually pay the foreign exchange dealer 270 until two days later based on the terms of the offer 265.

Figure 8:
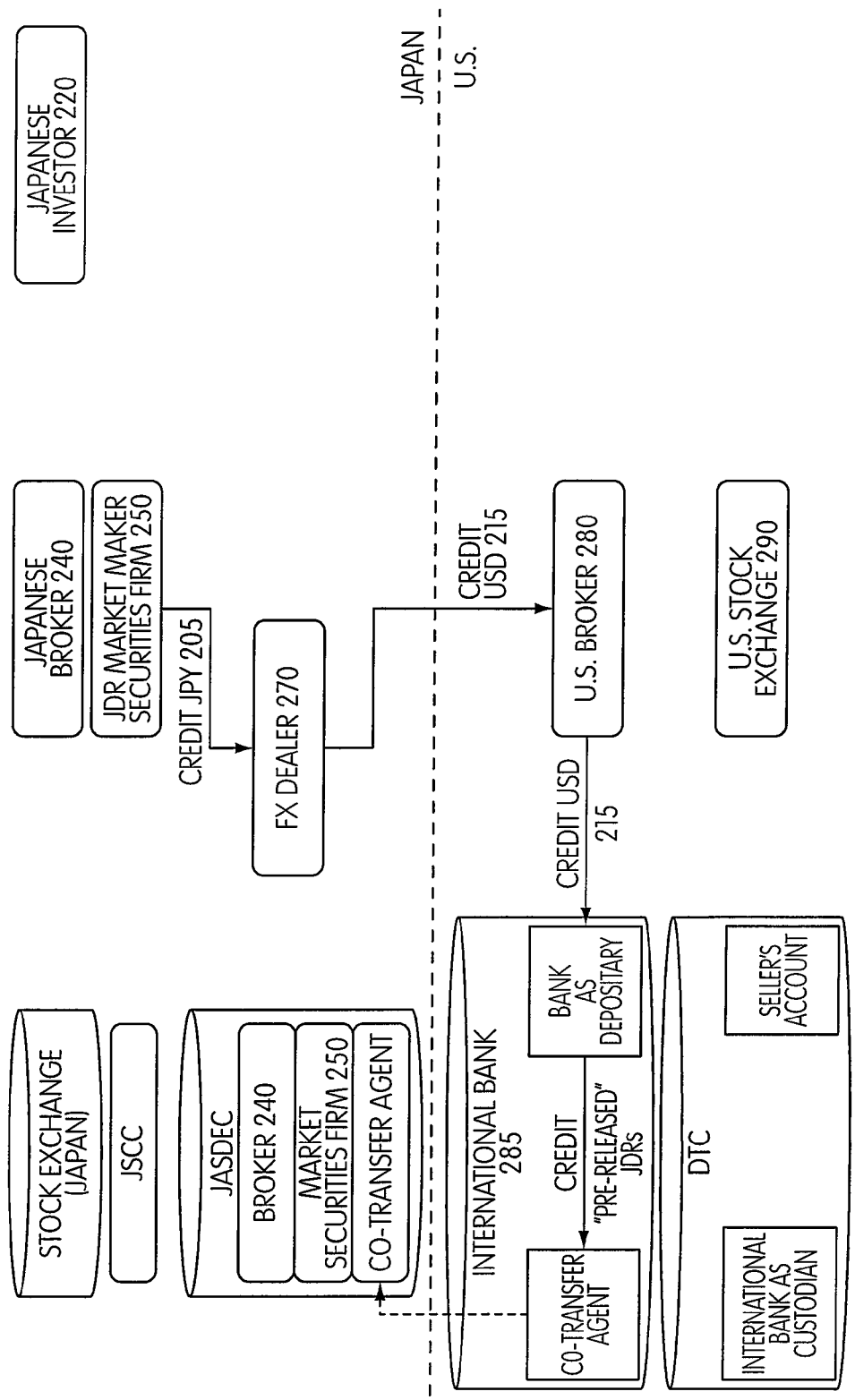
FIG. 8 illustrates operation and cooperation of parties involved in the process for JDR trading on the Japanese Exchange on the U.S. trading day corresponding to the JDR trade date in Japan plus two days in accordance with at least one embodiment of the invention.

FIG. 8 illustrates operation and cooperation of parties involved in the process for JDR trading on the Japanese Exchange on the U.S. trading day corresponding to the JDR trade date in Japan plus two days. As illustrated in FIG. 8 (day 2.5), the U.S. broker 280 receives an indication that a U.S. dollar credit 215 from the foreign exchange dealer 270 has been received on behalf of the market maker securities firm 250, who is both a client of the foreign exchange dealer 270 and also the U.S. broker 280. Thus, the U.S. broker 280 has received advanced payment of the purchase price for the underlying securities of the JDR.

Figure 9:
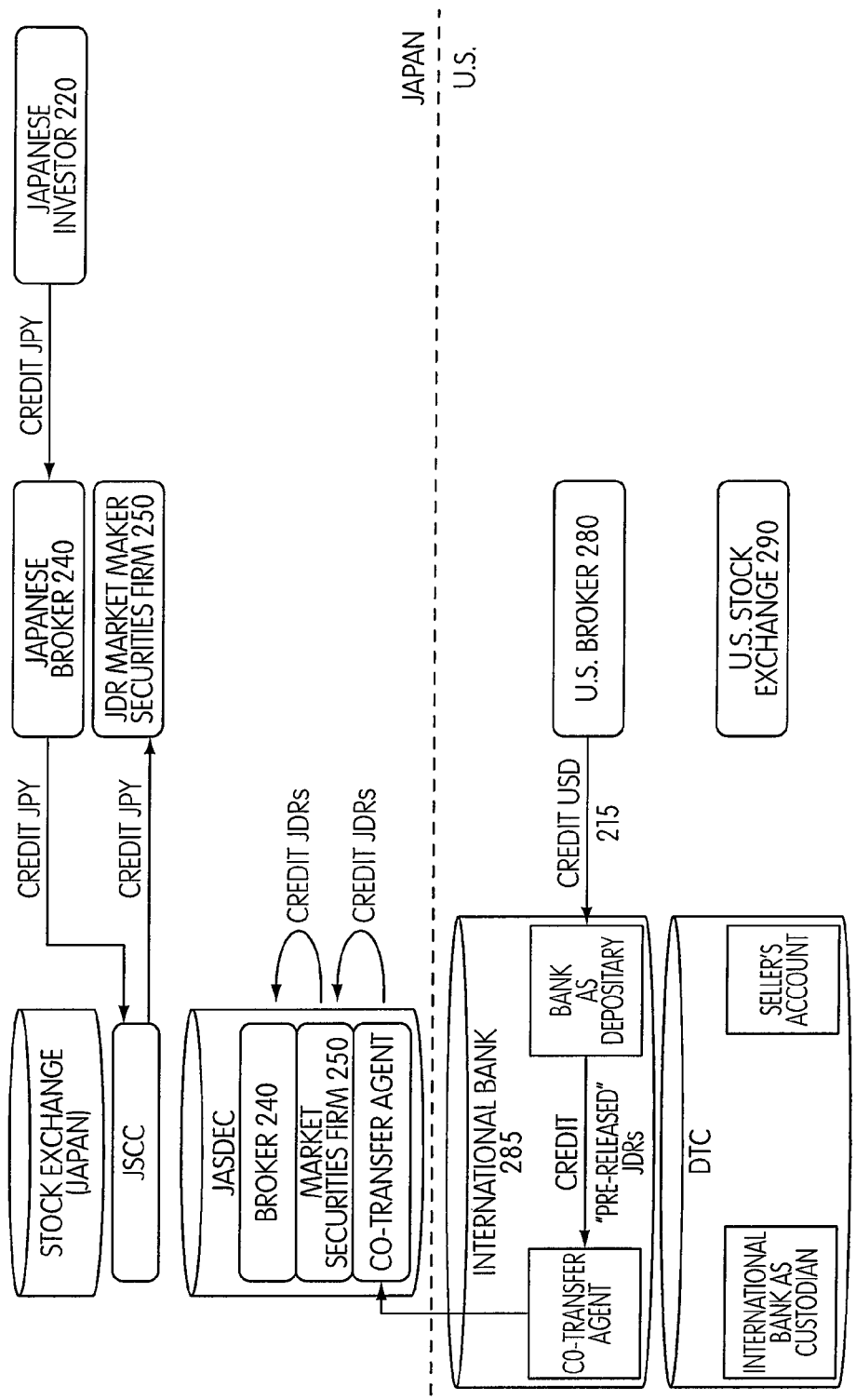
FIG. 9 illustrates operation and cooperation of parties involved in the process for JDR trading on the Japanese Exchange on the JDR trade date in Japan plus three days (settlement date) in accordance with at least one embodiment of the invention.
Figure 10:
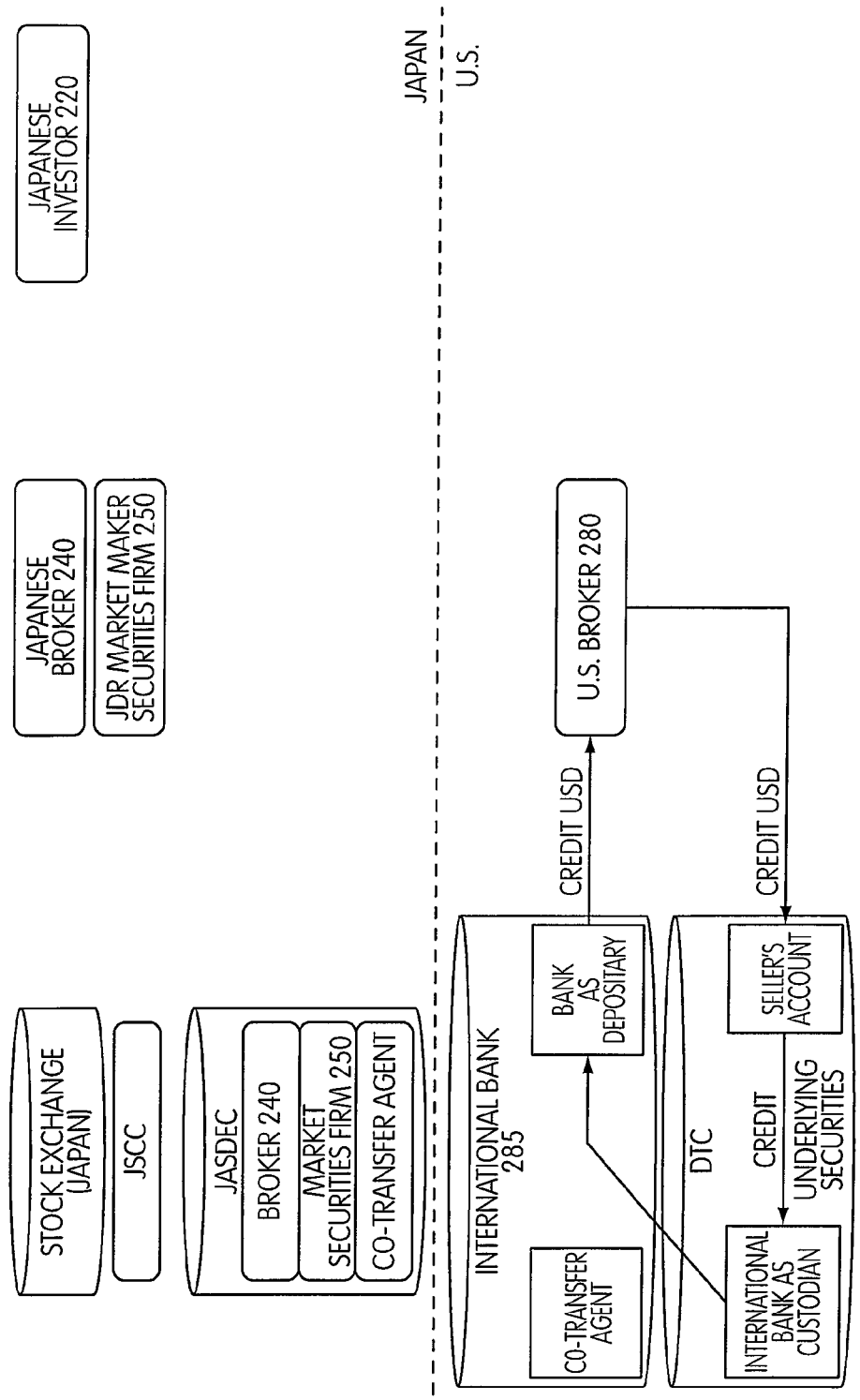
FIG. 10 illustrates operation and cooperation of parties involved in the process for JDR trading on the Japanese Exchange on the U.S. trading day corresponding to the JDR trade date in Japan plus three days (settlement date) in accordance with at least one embodiment of the invention.

However, as illustrated in FIG. 9 (day 3.0: operation and cooperation of parties involved in the process for JDR trading on the Japanese Exchange on the JDR trade date in Japan plus three days (settlement date)), in order to satisfy the securities buy order 255 in Japan, the JDR must be issued to the Japanese market maker firm 250 in time for the firm 250 to settle the buy order 230 on day 3.0 (FIG. 10: operation and cooperation of parties involved in the process for JDR trading on the Japanese Exchange on the U.S. trading day corresponding to the JDR trade date in Japan plus three days (settlement date)) because the JDR also settles on a "trade date plus 3 business days" basis. As a result, because Japan's trading day starts half a day (0.5) ahead of the United States, the trade in the United States for the underlying securities for the JDR needs to be settled in time for the market maker firm 250 to settle the JDR trade in Japan. To do otherwise, results in the market maker firm 250 failing to settle the JDR trade, which results in large fines. Therefore, the advanced payment of the underlying securities purchase price enables the broker 280 to transfer the advanced payment to the international bank 285, "as depositary."

Returning to the coat check analogy, the status of "as depositary" means that the funds are being held in the same way that a coat check holds a coat for its owner. Thus, the U.S. dollar credit 215 for the purchase price of the underlying securities is transferred to the international bank 285, which holds it as collateral. The international bank 285 then issues the depositary receipt before the underlying securities can be received based on the U.S. dollar credit; the depositary receipt may also be referred to as a pre-released depositary receipt, which is described in more detail below.

When the depositary receipt is pre-released, a Japanese bank, e.g., a Japanese bank or other financial institution, is credited for them. Thereafter, the Japanese bank acts as a local co-transfer agent for the pre-released depositary receipt. That local co-transfer agent is an account holder with the international bank 285. Thus, the international bank 285 credits that local co-transfer agent's account, which may be only a transfer agent account with a specified amount of the pre-released JDRs. When the trading day ends in the United States, the Japanese bank will issue a credit to its sister or parent company in Japan, as illustrated in FIG. 9.

Having received credit in its account at the international bank 285 for a specified amount of JDRs, the Japanese bank is then able to credit the market maker securities firm 250 with that specified amount of JDRs in the Japan Securities Depository Center (JASDEC), the market maker firm 250 is then in possession of the specified amount of JDRs, and transfers that amount to its counterpart broker 240 in the JASDEC. Broker 240 then pays Japanese yen to the market maker firm 250 in the amount specified previously (see 265 in FIG. 3). Those yen credited to the JDR securities market maker firm 250 replenish the yen that was used by the market maker firm 250 to buy the U.S. dollars the previous day, day 2.0 (FIG. 7). With the broker 240 being credited with the JDRs and with the market maker securities firm 250 having received the specified yen, the sale in Japan is thereby consummated. As a result, the broker 240 provides the Japanese investor 220 with international exposure by offering investment in Japanese yen denominated, domestic securities that are valued pursuant to international price setting.

Figure 11:
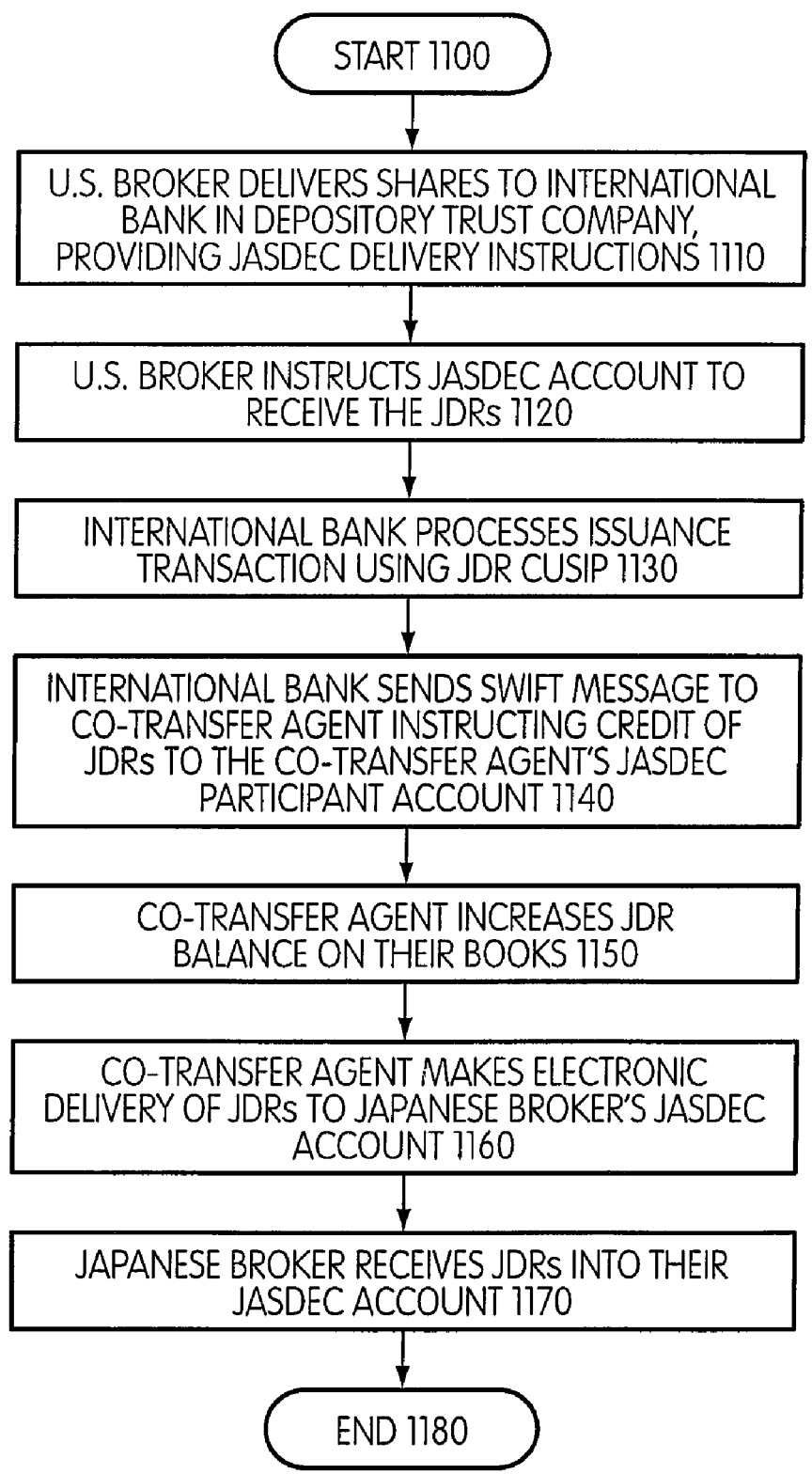
FIG. 11 illustrates settlement process operations performed as part of a JDR issuance process where the underlying share is a U.S. equity in accordance with at least one embodiment of the invention.

FIG. 11 illustrates settlement process operations performed as part of a DR issuance process where the underlying share is a U.S. equity in accordance with at least one embodiment of the invention.

As illustrated in FIG. 11, settlement process operations begin at 1100 and a U.S. broker delivers the underlying shares purchased for the JDR to the international bank's participant account at the DTC and providing the JASDEC delivery instructions at 1110. The U.S. broker then instructs the JASDEC account to receive the JDR's at 1120. Subsequently, or simultaneously, the international bank processes the JDR issuance transaction using the JDR's CUSIP security identifier at 1130. The international bank then sends finds to the Broker's DTC participant account for the issuance fee and sends a message over to SWIFT messaging network to the local co-transfer agent instructing a credit of JDRs to the local co-transfer Agent's JASDEC participant account at 1140.

The local co-transfer agent then increases the JDR balance on their books at 1150. At 1160, the local co-transfer agent makes electronic delivery of JDRs to the Japanese broker's JASDEC participant account. Subsequently, the Japanese Broker receives the JDRs into their JASDEC account 1170 and the operations end at 1180.

Figure 12:
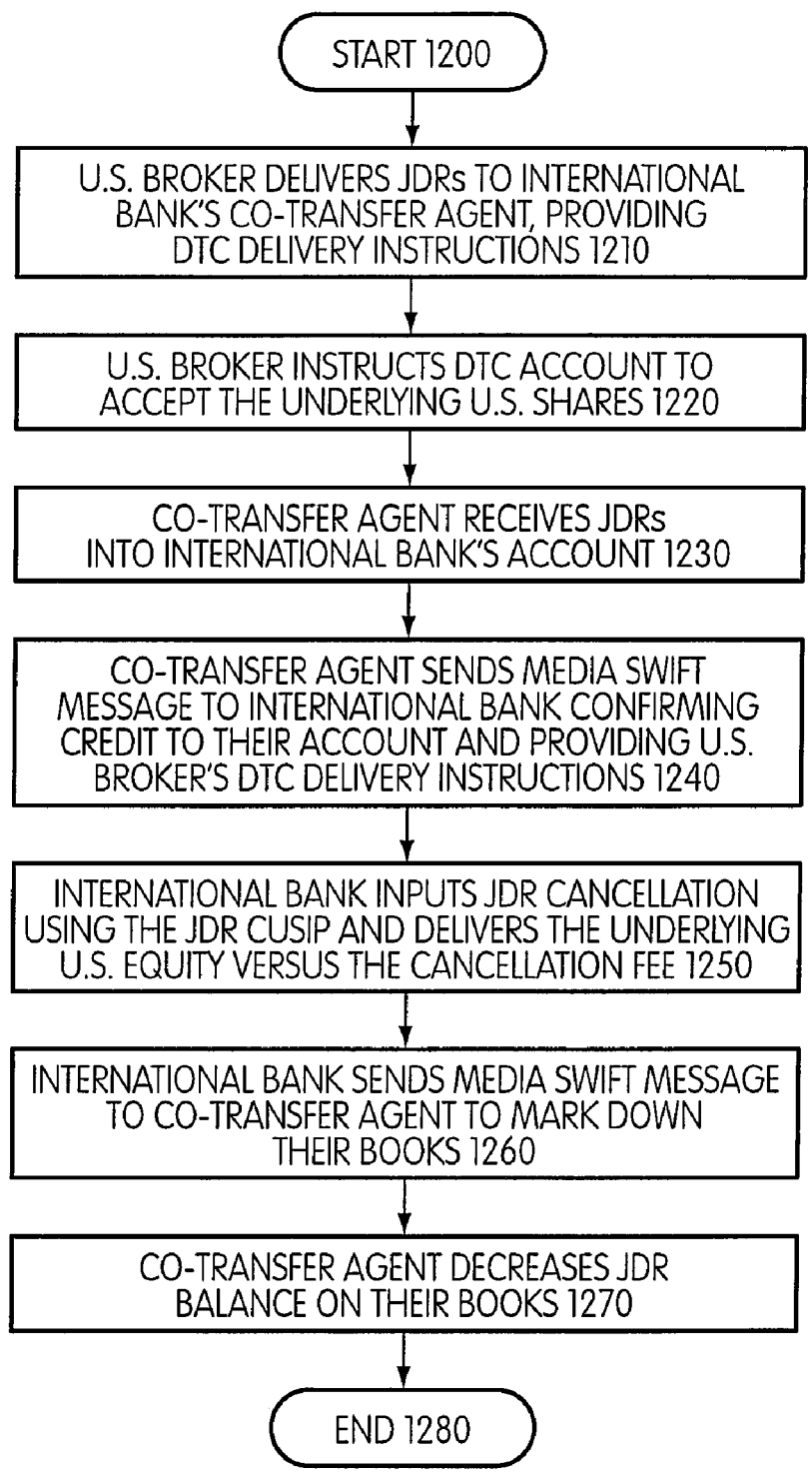
FIG. 12 illustrates settlement process operations performed as part of JDR cancellation where the underlying share is a U.S. equity in accordance with at least one embodiment of the invention.

FIG. 12 illustrates settlement process operations performed as part of a JDR cancellation process where the underlying share is a U.S. equity in accordance with at least one embodiment of the invention. Operations begin at 1200 and continue to 1210 at which a U.S. broker delivers JDRs to an international bank's local co-transfer agent, providing the DTC delivery instructions. Subsequently, or simultaneously, the U.S. broker instructs the specified DTC account to accept the underlying U.S. shares at 1220. The local co-transfer agent then receives JDRs into the international bank's account at 1230. At 1240, the local co-transfer agent sends an MT599 SWIFT message over the SWIFT network to the international bank confirming credit to their account and providing the U.S. broker's DTC delivery instructions.

At 1250, the international bank inputs the JDR cancellation using the JDR CUSIP security identifier and delivers the underlying U.S. equity versus the cancellation fee to the Broker. At 1260, the international bank sends a MT599 SWIFT message to the local co-Transfer Agent to mark down their books. Subsequently at 1270, the local co-transfer Agent decreases the JDR balance on their books and operations end at 1280.

As should be understood from the above-described description, implementation of the JDR creation methodology provided in accordance with at least one embodiment of the invention enables Japanese investors to guard against potential fluctuations in the yen/dollar exchange rate in the period between when the investor placed the order for a security exchanged on the U.S. stock market and when that investor must supply payment for that order (three days later). If the yen appreciates against the dollar during that period, then the number of U.S. securities shares is reduced. Similarly, if the yen becomes weaker against the dollar during that time, the Japanese investor's investment grows in value to the same extent as the value of the currency. As a result, a balance between equity and currency valuation is preserved that best serves the investor.

Further, in accordance with at least one embodiment of the invention, a particularly valuable investment tool may be provided for investors and investment entities, e.g., pension funds or trusts, with charters or operating policies that forbid investment outside of a particular jurisdiction, e.g., Japan, but the portfolio requires an international component in order to maximize return and minimize risk. Thus, JDR created in accordance with the claimed invention may provide a Japanese instrument, denominated in Japanese yen, that is less subject to international fluctuations that affect the underlying U.S. security on any given day and the yen/dollar exchange rate. Therefore, a Japanese investor bound to invest only in Japanese markets may acquire international exposure by investing in such JDR's without having to leave Japan, without opening a brokerage account in the United States, without having to buy U.S. dollars, and without having to hire a U.S. broker to acquire the JDRs. Rather, all those intermediate steps may be performed on their behalf in a timely manner that guards against currency market fluctuation. In return for the opportunity to obtain international exposure by investing in JDR's without having to establish, manage and maintain additional international relationships, a JDR processing fee may be assessed for each set of JDR transactions.

Also, embodiments of the invention may include trading and settlement with Asian markets in which there is some or no overlap in the settlement day with U.S. markets. Like the Japanese example described above, these Asian market trades and settlements may be carried out in the same fashion. In some instances there may be some overlap in the settlement days of the two applicable markets while in other instances there may be no overlap in settlement days. Nevertheless, DRs may be traded and settled as described herein.

Still further embodiments are also possible. For example, rather than have the purchase of foreign securities begin with the receipt of a buy order from an investor, an underwriting firm, such as the market maker firm 250, may purchase the securities with buy orders in anticipation of receiving customer orders for DRs representing the securities. These buy orders may be for single securities as well as for Exchange Traded Funds (ETFs). The underwriting firm may chose to make a purchase prior to the commencement of an underwriting period. If the order is placed that day, this would be one-half of a day ahead of the U.S. trade date. In this instance, the underwriting firm's U.S. agent places the buy order for the U.S. securities in the U.S. and the U.S. trade date. An offering price may be set in Japan on the following day in Japan, which is one-half day after the U.S. trade date. This offering price may include an underwriting spread and may use a foreign exchange agent to fix the exchange rate by spot buying U.S. dollars. At the same time, the Japanese underwriter may receive orders for JDRs from its Japanese customers. On day three of the underwriting period, the source of capital used to purchase the U.S. securities will provide the capital to the underwriter, who will in turn provide it to the foreign exchange dealer in order to credit, in U.S. dollars, the underwriter's U.S. agent who placed the trade. One day three after the trade in the U.S., the U.S. agent's DTC account will be credited, the underlying securities will be delivered to a custodian, and credits will ultimately flow to the local co-transfer agent's account in the international bank and to the local co-transfer agent's account in JASDEC. One day three after the underwriting in Japan, which is the U.S. trade date plus three and one-half days, the investors will credit the underlying firm for the JDR and the underwriting firm will credit the Japanese source of capital. Any difference of funds received from the investors and the cost of the underlying securities, amounts to profit for the Japanese underwriter.

As mentioned, the DRs may also be traded as a "pre-release." A pre-release is the issuing of an DR, secured by cash collateral rather than deposited underlying shares. Pre-releases are used by brokers who need to settle cross-border trades. In a pre-release, the depositary bank delivers DRs before deposit of the underlying shares. The depositary bank may also deliver the underlying shares upon surrender of pre-released DRs (even if the ADRs are surrendered before the pre-release transaction has been closed out). A pre-release is closed out as soon as the underlying shares are delivered to the depositary bank. The depositary bank may receive DRs instead of shares to close out a pre-release.

Figure 13:
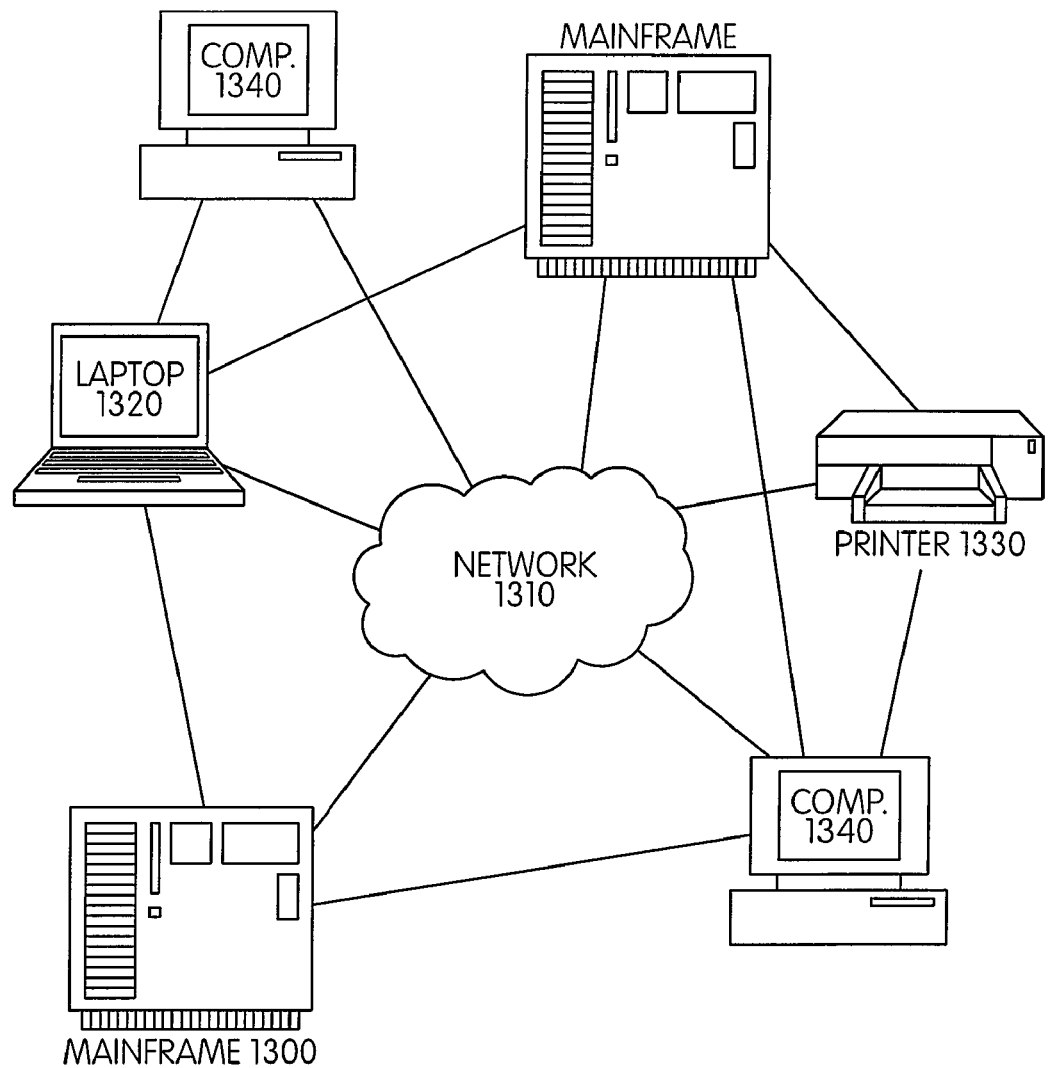
FIG. 13 illustrates a network and associated computing devices that use the network in accordance with embodiments of the invention.

FIG. 13 illustrates computing devices that may be used when practicing embodiments of the invention. FIG. 13 shows a network 1310, mainframes 1300, computers 1340, a laptop computer 1320, and a printer 1330. These computing devices as well as others may be used to practice embodiments of the present invention. They may store and exchange information needed to maintain accounts and carry out the exchanges described herein or otherwise required. The mainframes may be located in one or more of the entities shown in FIG. 2. This can include the Japanese Broker 240, the Market Securities Firm 25, the International Bank 285 and the U.S. Broker 280. Likewise, the other computing devices can reside in these and other locations as well. As shown in FIG. 2, the devices may communicate directly with each other and may communicate with each through a network. This network 1310 may be a secure network within on individual organization, across organizations and publicly available networks as well.

Although not described in detail herein, those skilled in the art will appreciate that the embodiments of the present invention can be implemented using one or more well-known computer, database, communications, and programming technologies. Also, those skilled in the art will further appreciate that the embodiments described herein are not limited to any specific financial trading standard, software package, operating system, communications network, protocol or computer hardware.

The foregoing disclosure of the present invention has been presented for purposes of illustration and description. It is not intended to be exhaustive or to limit the invention to the precise forms disclosed. Many variations and modifications of the embodiments described herein will be possible in light of the above disclosure. The scope of the invention is to be defined by the claims appended hereto, and by their equivalents. For example, at least one embodiment of the invention may provide a DR that enables domestic stock exchange investment based on underlying shares (which need not all be for the same business entity) that are traded on one or more exchanges, at least one of which having a trading day with no temporal overlap with the domestic stock exchange.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method of creating a financial instrument that is tradable on a first stock exchange and is supported by a quantity of underlying shares of at least one foreign business entity through at least one second stock exchange, the method comprising:

receiving, over a network, an order to buy a first quantity of shares on the second stock exchange at an order price based, at least in part, on a first foreign currency exchange rate on a trade date;

processing, via a processor coupled to the network, the order on the trade date;

receiving, via the network, a purchase price for the order on a settlement date that is subsequent to the trade date, the purchase price comprising proceeds of a sale of foreign currency stemming from an offer made on the trade date and a difference between the first foreign currency exchange rate on the trade date and a second foreign currency exchange rate on the settlement date, wherein the second stock exchange has a settlement time that begins later than and has substantially no temporal overlap with the first stock exchange's settlement time, and a purchase price of the financial instrument on the first stock exchange is fixed in a currency associated with the second stock exchange on the trade date; and accounting for a difference between the order price determined, at least in part, by the first foreign currency exchange rate on the trade date, and the purchase price determined by the order price adjusted by the second foreign currency exchange rate on the settlement date due to the difference between the first stock exchange settlement time and the later second stock exchange settlement time, wherein, based upon said accounting for a difference, a purchased number of shares on the second stock exchange associated with the financial instrument is a second quantity of shares different from the first quantity of shares associated with an original order to buy the first quantity of shares on the second stock exchange.

2. The method of claim 1, wherein the financial instrument is a depositary receipt.

3. The method of claim 1, wherein the first stock exchange is in Asia.

4. The method of claim 1, wherein the second stock exchange is in the United States.

5. The method of claim 1, wherein the underlying shares are shares of a United States business entity.

6. The method of claim 1, wherein said accounting for a difference between the order price and the purchase price comprises accounting for a currency conversion fluctuation due to the difference between the first stock exchange settlement day and the later second stock exchange settlement day.

7. A computer-implemented method of performing networked settlement operations for a financial instrument that is tradable on a first stock exchange and is supported by a quantity of underlying shares of at least one foreign business entity through at least one second stock exchange, the method comprising:

receiving, over the network, delivery instructions from the broker or an agent thereof;

processing, in a processor coupled to the network, an issuance transaction for the financial instrument;

sending a message over the network to a local-transfer agent instructing a credit of the financial instrument in a participant account associated with a local securities settlement system, wherein a settlement day of the second stock exchange has substantially no temporal overlap with a settlement day of the first stock exchange and a purchase price of the financial instrument on the first stock exchange is initially established in a currency associated with the second stock exchange on a trade date using a first foreign currency exchange rate associated with the trade date; and accounting for a difference between the initially established purchase price and a final adjusted purchase price using a second foreign currency exchange rate associated with the settlement day after the trade date resulting from the substantially no temporal overlap between the first stock exchange settlement day and the later second stock exchange a settlement day.

8. The method of claim 7, wherein the broker participant account is at the DTC.

9. The method of claim 7, wherein a local agent of the depository bank has a method of communication with a local securities settlement system.

10. The method of claim 7, wherein the financial instrument is a depositary receipt.

11. The method of claim 7, wherein the first stock exchange is in Asia.

12. The method of claim 7, wherein the second stock exchange is in a market different from where the financial instrument is traded.

13. The method of claim 7, wherein the underlying shares are shares of a United States business entity.

14. A computer-implemented method of performing settlement operations for a financial instrument that is tradable on a first stock exchange and is supported by a quantity of underlying shares of at least one foreign business entity through at least one second stock exchange, the method comprising:

receiving instructions via a network at an international financial institution that ownership of underlying shares of a financial instrument sold on the second exchange has been delivered to a custodian; and issuing a credit to an account at an international financial institution associated with a foreign co-transfer agent via a processor coupled to the network, the credit reflecting that the underlying shares of the financial instrument has been delivered to the custodian;

wherein upon receiving the credit via the network, the foreign co-transfer agent sends further instructions received by an associated co-transfer agent of the first stock exchange, wherein the further instructions sent to the associated local-transfer agent of the first stock exchange updates ownership of depositary receipts being backed by the underlying shares delivered to the custodian, and wherein a settlement day of the first stock exchange begins before a settlement day of the second stock exchange and the settlement day of the second stock exchange does not substantially temporally overlap with the settlement day of the first stock exchange.

15. The method of claim 14 wherein the ownership of the depositary receipt is transferred to an account associated with an investor.

16. The method of claim 14 wherein the ownership of the depositary receipt is transferred to an account associated with a financial underwriting firm.

17. The method of claim 16, further comprising the financial underwriting firm providing instructions to purchase stock shares on the second exchange associated with the depositary receipts; and using the processor to account for a difference between an initial purchase price and a final purchase price of the stock shares on the second exchange resulting from a difference between the first stock exchange settlement day and the later second stock exchange settlement day, said difference resulting from different foreign currency exchange rates on the first stock exchange settlement day and the later second stock exchange settlement day.

18. A system for creating a financial instrument that is tradable on a first stock exchange and is supported by a quantity of underlying shares of at least one foreign business entity through at least one second stock exchange, the system comprising:

a processor coupled to a network and configured to:

receive an order to buy a quantity of shares on the second stock exchange at an order price and to process the order on a trade date; and receive, via the network, a purchase price for the order on a settlement date that is subsequent to the trade date, the purchase price resulting from proceeds of a sale of foreign currency stemming from an offer made on the trade date, wherein the second stock exchange has a settlement day that begins later than and has substantially no temporal overlap with the first stock exchange's settlement day and a purchase price of the financial instrument on the first stock exchange is fixed in a currency associated with the second stock exchange on the trade date, and wherein the processor is further configured to account for a difference between the order price and the purchase price due to the difference between the first stock exchange settlement day and the later second stock exchange settlement day, wherein the difference is determined by different foreign currency exchange rates on the first stock exchange settlement day and the later second stock exchange settlement day.

19. The system of claim 18, wherein said processor accounts for the difference between the order price and the purchase price by adjusting a purchased number of shares associated with the financial instrument to be different from the ordered quantity of shares on the second stock exchange.

20. The method of claim 18, wherein said processor accounts for the difference between the order price and the purchase price by accounting for a currency conversion fluctuation due to the difference between the first stock exchange settlement day and the later second stock exchange settlement day.

* * * * *